United States Patent
Gilkerson et al.

(10) Patent No.: US 9,639,361 B2
(45) Date of Patent: *May 2, 2017

(54) TRACING SPECULATIVELY EXECUTED INSTRUCTIONS

(71) Applicant: ARM Limited, Cambridge (GB)

(72) Inventors: Paul Anthony Gilkerson, Cambridge (GB); John Michael Horley, Cambridge (GB)

(73) Assignee: ARM LIMITED, Cambridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/205,438

(22) Filed: Mar. 12, 2014

(65) Prior Publication Data

US 2014/0195786 A1    Jul. 10, 2014

Related U.S. Application Data

(63) Continuation of application No. 13/067,603, filed on Jun. 13, 2011, now Pat. No. 8,769,344.

(30) Foreign Application Priority Data

Jun. 21, 2010    (GB) .................................... 1010356.2

(51) Int. Cl.
*G06F 11/00*    (2006.01)
*G06F 9/30*    (2006.01)
(Continued)

(52) U.S. Cl.
CPC ........ *G06F 9/30145* (2013.01); *G06F 11/348* (2013.01); *G06F 11/3476* (2013.01);
(Continued)

(58) Field of Classification Search
CPC ............. G06F 9/30145; G06F 11/3636; G06F 11/348; G06F 11/3466; G06F 11/3476;
(Continued)

(56) References Cited

U.S. PATENT DOCUMENTS 5,564,028 A    10/1996 Swoboda et al.
5,715,440 A *    2/1998 Ohmura ................ G06F 9/3846
                                                               712/233

(Continued)

FOREIGN PATENT DOCUMENTS

CN    101082875    12/2007
GB    2 412 199    9/2005
(Continued)

OTHER PUBLICATIONS dictionary definition for "branch prediction" retrieved from https://en.wikipedia.org/wiki/Branch_predictor on Sep. 19, 2015, pp. 1-3.*

(Continued)

*Primary Examiner* — Yair Leibovich
(74) *Attorney, Agent, or Firm* — Nixon & Vanderhye, P.C.

(57) ABSTRACT

A trace unit for generating items of trace data indicative of processing activities of a processor executing a stream of instructions, the unit includes trace circuitry for monitoring a behavior of the processor; storage circuitry for storing current trace control data for controlling the trace circuitry; a data store for storing at least some of the trace control data; the trace circuitry being configured to store the trace control data in the data store in response to detection of execution of the group of instructions, wherein the trace circuitry is responsive to detecting the at least one processor cancelling at least one group of the speculatively executed instructions to retrieve at least some of the trace control data stored in the data store for the group of instructions executed before the cancelled speculatively executed instructions and to store the retrieved trace control data in the storage circuitry.

31 Claims, 11 Drawing Sheets

(51) Int. Cl.
*G06F 11/36* (2006.01)
*G06F 11/34* (2006.01)

(52) U.S. Cl.
CPC ...... *G06F 11/3636* (2013.01); *G06F 11/3471* (2013.01); *G06F 2201/865* (2013.01); *G06F 2201/88* (2013.01)

(58) Field of Classification Search
CPC ........... G06F 11/3471; G06F 2201/865; G06F 2201/88
USPC ............................................. 714/45; 712/227
See application file for complete search history.

(56) References Cited

U.S. PATENT DOCUMENTS

| | | | |
|---|---|---|---|
| 5,802,272 A | 9/1998 | Sites et al. | |
| 6,021,488 A | 2/2000 | Eisen et al. | |
| 6,094,729 A * | 7/2000 | Mann | G06F 11/348 |
| | | | 714/25 |
| 6,681,321 B1 | 1/2004 | Dale et al. | |
| 7,487,340 B2 | 2/2009 | Luick | |
| 7,707,394 B2 | 4/2010 | Ashfield et al. | |
| 8,069,336 B2 | 11/2011 | Alsup et al. | |
| 8,769,344 B2 * | 7/2014 | Gilkerson et al. | 714/45 |
| 2003/0088854 A1 * | 5/2003 | Wygodny | G06F 11/3636 |
| | | | 717/130 |
| 2003/0204374 A1 * | 10/2003 | Madsen | G06F 11/3466 |
| | | | 702/186 |
| 2005/0276388 A1 | 12/2005 | Ethier et al. | |
| 2008/0155339 A1 * | 6/2008 | Lowe et al. | 714/38 |
| 2008/0172548 A1 | 7/2008 | Caprioli et al. | |
| 2010/0070804 A1 * | 3/2010 | Bolignano | G06F 11/28 |
| | | | 714/38.13 |
| 2011/0219376 A1 | 9/2011 | Williams et al. | |

FOREIGN PATENT DOCUMENTS

| | | |
|---|---|---|
| JP | 5-46430 | 2/1993 |
| JP | 2007-515715 | 6/2007 |
| JP | 2009-540412 | 11/2009 |
| WO | WO 2007/141252 | 12/2007 |
| WO | WO 2009/133354 | 11/2009 |

OTHER PUBLICATIONS

Search Report for UK 1010356.2 dated Oct. 19, 2010.
Japanese Office Action dated May 7, 2014 in JP 2011-136189.
English translation of Chinese Office Action dated Jan. 22, 2015 in CN 201110184047.4, 10 pages.
Office Action in Chinese Application No. 201110184047.4 dated Sep. 24, 2015 (with English translation).
Office Action in corresponding Chinese Application No. 201110184047.4 dated Mar. 16, 2016.

* cited by examiner

| Core execution (Address, Group, Instruction) | | | Trace Enable | Trace Output | |
|---|---|---|---|---|---|
| 1000 | A | Branch | 1 | E key 1 | |
| 2000 | B | Branch | 1 | E key 2 | The commit calculation is (trace key of committed group) - (oldest previous commit). In this case this is 3-0=3 |
| 3000 | C | Branch | 1 | E key 3 | |
| 3004 | D | NOP | 1 | | |
| 3008 | D | Branch | 1 | E key 4 | |
| | | Commit C | | Commit 3 | |

FIG. 5

| Core Execution | | | Trace Enable | Trace Output | Traced Interesting | |
|---|---|---|---|---|---|---|
| 1000 | A | Branch | 1 | E key 1 | 1 | |
| 2000 | B | Branch | 1 | E key 2 | 1 | Commit only 2 because the branch at 3000 was not traced. The traced_interesting bit indicates the commit N is one less than in the previous example |
| 3000 | C | Branch | 0 | | 0 | |
| 3004 | D | NOP | 0 | | | |
| 3008 | D | Branch | 1 | E key 3 | 1 | |
| | | Commit C | | Commit 2 | | |

FIG. 6

| Core execution | | | Trace Enable | Trace Output | Previous Traced | |
|---|---|---|---|---|---|---|
| 1000 | A | Branch | 0 | | | |
| 2000 | B | Branch | 1 | Trace-on, E | 0 | |
| 3000 | C | NOP | 0 | | 1 | |
| 3004 | C | NOP | 0 | | | No trace-on element is required because all the instructions that were not traced were cancelled |
| 3008 | C | Branch | 0 | | | |
| | | Cancel C | | | | |
| 4000 | D | Branch | 1 | E | 1 | |

FIG. 7

| Core Execution | Trace Enable | Trace Output | | | Initial Traced | Previous Traced |
|---|---|---|---|---|---|---|
| 1000 A Branch | 1 | E | | | 1 | |
| 3000 B NOP | 0 | | | A extra state element must be output otherwise the preceding State 3004 will be used and execution will be implied for the wrong instructions | 0 | 1 |
| 3004 B NOP | 1 | Trace on, State 3004 | | | | |
| 3008 B Branch | 1 | E | | | | |
| Cancel B | | Cancel 1 | | | | |
| 4000 C NOP | 1 | State 4000 | | | 1 | 1 |
| 4004 A Branch | 1 | E | | | 1 | |

FIG. 8

| Core Execution | Trace Enable | Trace Output | Sticky Value | | | |
|---|---|---|---|---|---|---|
| 1000 A Branch | 1 | E | 0 | | | |
| 3000 B NOP | 1 | | 1 | In control register 60 | 0 in data store 1 | |
| 3004 C NOP | 0 | | 1 | | | |
| 3008 C Branch | 0 | E | | Atom is present in trace output even though trace enable is 0. This is necessary to imply execution of the NOP at 3000 | | |

FIG. 9

| Core Execution | Trace Enable | Trace Output | Sticky Value | | | |
|---|---|---|---|---|---|---|
| 1000 A Branch | 1 | E | 0 | | | |
| 3000 B NOP | 1 | | 1 | In control register 60 | 0 in data store 65 | |
| 3004 C NOP | 0 | | 1 | | 1 | |
| 3008 C Branch | 0 | E | 0 | | 1 | |
| 4000 D Branch | 1 | E | | | | |
| Cancel C | | Cancel 2 | | | | |
| 3004 A Exception | 0 | Exception | 1 | The exception is traced even though trace enable is low. This is necessary to imply execution of the NOP at 3000 | | |

FIG. 10

| Core execution | | | Trace enable | Trace output | Trace key | Counter | Sticky value | Previous traced | Initial traced | Trace load/store | Multiple trace | Oldest committed | Traced Interesting |
|---|---|---|---|---|---|---|---|---|---|---|---|---|---|
| 1000 | A | Branch | 1 | E | key1 | key1 | 0 | | 1 | | 0 | 0 | 1 |
| 3000 | B | NOP | 1 | | | key2 | 1 | 1 | | | 0 | 0 | 0 |
| 3004 | C | NOP | 0 | | | key2 | 1 | 1 | | | 0 | 0 | 0 |
| 3008 | C | Branch | 0 | E | key2 | key2 | 0 | | 0 | | 0 | 0 | 1 |
| 4000 | D | Branch | 1 | E | key3 | key3 | 0 | 0 | 1 | | 0 | 0 | 1 |
| Cancel C | | | 1 | Cancel 2 | | key1 | | | | | | | 1 |
| 5000 | E | Branch | 1 | E | key2 | key2 | 0 | 1 | 1 | | 0 | 0 | 1 |
| 5004 | E | Load | 1 | E | key3 | key3 | 0 | | | 1 | 1 | 0 | 1 |
| 5008 | J | Load | 0 | | | key4 | 0 | 1 | 0 | | 0 | 0 | 0 |
| 6000 | F | NOP | 1 | Trace on, state 6000 | | key4 | 1 | 0 | 1 | | 0 | 0 | 1 |
| 6004 | F | Branch | 1 | E | key4 | key4 | 0 | | | | | | |
| Commit B | | | | Commit 1 | | key5 | 1 | | 1 | | 0 | 2 | 1 |
| 7000 | G | Branch | 1 | E | key5 | key5 | 0 | 1 | 1 | | 0 | 2 | 1 |
| 7004 | G | NOP | 1 | | | key6 | 1 | | | | | | |
| 8000 | H | NOP | 1 | | | key6 | 1 | 1 | | | 0 | 2 | 0 |
| 8004 | H | Branch | 1 | E | key6 | key6 | 0 | | | | | | 1 |

FIG. 13

TRACING SPECULATIVELY EXECUTED INSTRUCTIONS

This application is a Continuation of U.S. patent application Ser. No. 13/067,603, filed Jun. 13, 2011, which claims priority to GB Application No. 1010356.2 filed Jun. 21, 2010. The entire contents of these applications are incorporated herein by reference.

BACKGROUND OF THE INVENTION

Field of the Invention

The field of the invention relates to data processing and in particular to diagnostic mechanisms for monitoring data processing operations.

Description of the Prior Art

There are a number of situations where it is desirable to keep track of the processing being performed by a processing circuit. For example, such information is useful during the development of data processing systems. An example of a tool that may be used to assist in such a process is a tracing tool.

Tracing the activity of a data processing system whereby a trace stream is generated that includes data representing the step-by-step activity within the system is a highly useful tool in system development. Such tracing tools use a variety of means for tracing the program flow including embedded trace macrocells (ETM, a trademark of ARM Limited, Cambridge) which are present on the chip whose processing is being monitored.

If the complete step by step activity of a processing system is monitored the amount of data that needs to be collected, transmitted and stored can be prohibitively large. Thus, various ways of reducing this amount of information have been devised. These include reducing the amount of trace data generated by only tracing some instructions such as branches and load/store instructions, all other "trace-inactive" instructions being inferred from the trace of these "trace-active" instructions and a knowledge of the instruction stream. Further reduction in the trace stream is possible by providing the ability to turn the trace on and off, so that for certain parts of the execution that are deemed trace-inactive no trace data is generated. This ability to only trace a subset of instructions is described in U.S. Pat. No. 7,707,394.

Most processor instruction set architectures include the ability to execute instructions speculatively in order to increase processing speed. Thus, for example, branch instructions that are conditional on the state of the data processing system at the point where the branch is processed, and will execute and branch to the destination if some condition is true, and not execute and continue to the next sequential instruction if the condition is false, may be predicted as executing in a certain way, so that the subsequent instructions can be executed before it is known whether the condition is true or false. If the prediction is wrong then the speculatively executed instructions will need to be cancelled and the processor restored to the state it had before the branch was taken.

It is not always straightforward when tracing speculatively executed instructions to keep the trace stream output consistent with the instructions that are actually committed.

SUMMARY OF THE INVENTION

Viewed from a first aspect, the present invention provides a trace unit for generating items of trace data indicative of processing activities of at least one processor executing at least one stream of instructions, said at least one stream of instructions comprising a plurality of groups of instructions, said at least one processor executing at least some of said instructions speculatively, said trace unit comprising: trace circuitry for monitoring a behaviour of said at least one processor, said trace circuitry being controlled by current trace control data; a data store for storing at least some of said trace control data associated with a corresponding one of said groups of executed instructions; said trace circuitry being configured to store said trace control data in said data store in response to detection of execution of said group of instructions; said trace circuitry being responsive to detecting said at least one processor cancelling at least one group of said speculatively executed instructions to retrieve at least some of said trace control data stored in said data store and to control said trace circuitry with said retrieved trace control data.

The present invention recognises that tracing data processing apparatus that execute speculative instructions may result in the trace data output being difficult to understand where instructions that have been executed speculatively are later cancelled. It addresses this problem by providing for the storage of trace control data associated with each group of executed instructions within a data store, so that when speculatively executed instructions are cancelled the value of previously used trace control data can be retrieved from the data store. The trace control data that was current at the relevant point can thus be restored.

In some embodiments said trace unit further comprises storage circuitry for storing said current trace control data for controlling said trace circuitry; wherein in response to detecting said at least one processor cancelling said at least one group of said speculatively executed instructions, said trace circuitry stores said retrieved trace control data in said storage circuitry.

Although the trace control data can simply be a logic state that can be used to control the trace circuitry in some embodiments it is stored in storage circuitry.

In some embodiments said trace control data is stored in said data store along with an identifier identifying said corresponding group of instructions.

The trace control data that is stored needs to be related to the group of instructions that it pertains to in some way. This may be with an identifier, or it may be in some other way such as in the storage format.

In some embodiments said trace circuitry is configured to retrieve said at least some of said trace control data stored in said data store for said cancelled group of instructions.

When a group of instructions has been cancelled then relevant trace control data that was current at a start of the cancelled group of instructions should be restored to enable the trace circuitry to function correctly. In some embodiments the trace control data that was current at the start of a group is stored in the data store for that group and thus, this is retrieved. In other embodiments the trace control data current at the end of execution of a group might be stored for that group in which case the trace control data for the group immediately preceding the cancelled group would be retrieved.

In some embodiments, said group comprises a group of instructions where if a first instruction within said group is executed all of said instructions within said group will execute.

The instructions can be grouped in a number of ways. In some embodiments a group may consist of single instructions, although this might result in the data store for storing the trace control data being large. The instructions should be grouped in a way, so that if the first instruction within the group is executed, the whole group will be executed. In other words, no exception can occur within a group and instructions will be cancelled and committed as whole groups. A speculatively executed instruction is committed or cancelled when its fate is known, i.e. it is known whether the speculation was correct, where it is committed or not, where it is cancelled In some embodiments, said trace control data comprises a sticky value, said trace circuitry being responsive to said sticky value having a predetermined value to output a trace value for a subsequently executed trace-active instruction whether or not a trace enable signal has an enabled value, a trace-active instruction being an instruction triggering output of an item of trace data.

A problem that can arise with the cancelling of speculatively executed instructions that are being traced is that where trace only outputs trace elements for trace-active instructions and implies that other instructions have been executed from the tracing of subsequent instructions, then where groups of instructions may be cancelled and where trace enable may be turned on or off at different times, if the final instruction in a group of instructions is not a trace-active instruction and if trace enable is turned off before the next instruction is traced then the diagnostic apparatus analysing the trace data will not know that this trace-inactive instruction has in fact executed. This problem is addressed by the use of a sticky value in the trace control data.

The trace circuitry is responsive to detecting execution of a final instruction in one of said groups of instructions, where said final instruction is not a trace-active instruction triggering output of an item of trace data, to set said sticky value in said trace control data for controlling a subsequent group of instructions and to store said sticky value in said data store for a subsequent group of instructions.

Thus, the sticky value is set for a subsequent group when a final instruction in a group is a trace-inactive instruction that does not output a trace element. Thus, the subsequent trace-active instruction to be executed outputs a trace element whether or not trace is enabled. When a trace element has been output the sticky value stored in the storage circuitry is reset. The sticky value allows the diagnostic apparatus analysing the trace data to recognise that the trace-inactive instruction did indeed execute. When a group of speculatively executed instructions are cancelled then the sticky value previously applied to the cancelled instructions is restored to the storage circuitry. Thus, as the sticky value has been stored for the subsequent group of instructions, if this group is cancelled, the sticky value is updated and the next trace-active instruction will output a trace element, so that execution of the final trace-inactive instruction in the preceding group can be implied.

In some embodiments said trace control data comprises a previous-traced value, said trace circuitry being configured to store a value of said trace enable signal when a final instruction in a preceding group is executed as said previous-traced value for said subsequent group, said trace circuitry being responsive to detecting said processor cancelling a group of speculatively executed instructions and to said trace enable value being enabled and to said previous-traced value stored associated with said cancelled group being set, to output a trace element indicating said trace is turning on.

A further problem that may arise with speculatively executed instructions being cancelled is that where trace is turned on, during a group of instructions that is subsequently cancelled, then any indication that may have been output that trace is turned on is lost. The previous-traced value is used to indicate where a trace on signal should be output in view of cancelled instructions. One simple way of setting the previous-traced value may be to store the trace enable value for the final instruction of a preceding group as the previous traced value for the subsequent group, thereby providing a simple way of indicating if trace was enabled or not when that group of instructions had finished executing.

In some embodiments, said trace control data comprises an initial-traced value, said initial-traced value being set for a group of instructions in response to trace being enabled for execution of a first instruction in said group, wherein in response to detecting said processor cancelling a group of instructions and said initial-traced value being clear for said group of instructions and said previous traced value being set for said group of instructions, said trace circuitry outputs a state element indicating an execution address of said instruction executed following said cancel.

A further problem may arise where trace is enabled during execution of a speculative group and this group is then cancelled. Where trace is enabled a state trace element may be output which indicates an execution address so that any diagnostic apparatus can understand where trace was enabled again. If these instructions are later cancelled then a problem may arise as the diagnostic apparatus will believe that execution is proceeding from the execution address output for the instructions that were cancelled. The use of the initial-traced value can help avoid this problem by triggering the output of a further state element indicating a further execution instruction address. Thus, in response to the cancellation of a group a further state element is output when initial-traced is clear for the cancelled group and previous traced is set for this group. Previous-traced being set indicates that trace was enabled when the final instruction of the previous group, in this case the group before the group that was cancelled, was executed, while initial-traced being clear indicates that it was not enabled when the first instruction of the cancelled group was executed. Thus, it may be enabled during execution of the cancelled group and a state element may have been output. Thus, an extra state element is output.

In some embodiments, said trace control data comprises a traced interesting value, said traced interesting value being set for a group in response to a trace element being output for said group and being clear for a group where no trace element is output for said group.

A further trace control value that embodiments of the present invention can use is a traced interesting value. This is used to indicate where trace elements are output for a group and where no trace elements are output for a group. It can be used to determine if a group that is committed was not traced and thus a commit count value in the trace output should not imply that it was. It can also be used in counter wrap around cases which will be described later.

In some embodiments said trace control data comprises a trace start/stop value for said group, said trace start/stop value influencing whether or not trace enable is set or not, said trace start/stop value being set in response to detected predetermined behaviour of said at least one processor.

Whether or not trace is enabled may be controlled by particular states of the processor. In some embodiments whether or not these states control the trace enable can be turned on or off with a start/stop value. Conventional processors have used this control value. However, where this is the case embodiments of the current invention store the value for a group, so that if that group is later cancelled the value can be restored to its correct value.

In some embodiments, said trace control data comprises a trace multiple value, said value being set indicating that said group comprises two trace-active instructions generating trace elements, said value not being set indicating that said group comprises one or zero trace-active instructions.

It may be that groups of instructions are limited to two or fewer trace-active instructions. In such a case, trace control data can include a trace multiple value that indicates whether or not a group has two trace-active instructions. In such a way, trace of a group can be performed using fewer values as becomes clear later.

In other embodiments said trace multiple value comprises a value indicating a number of trace-active instructions in said group.

In other embodiments the trace multiple value may be several bits and may indicate the number of trace-active instructions that are present in a group. In this way a two bit value can indicate whether there are 1, 2, 3 or 4 trace active instructions in a group which is more efficient than storing two trace keys (indicating the first and last values) would be.

In some embodiments said trace unit is configured to generate an index value and to store said index value associated with each of said groups of instructions, said index value being updated for every trace element generated.

One way of keeping track of the trace elements generated is to provide an index value which can be associated with each group of instructions and is updated for every trace element generated. Indexing in this way provides information that is easy to compress and can be understood by the diagnostic apparatus analysing the trace data.

In some embodiments, said trace unit comprises a counter for generating said index value, said trace circuitry storing in said data store for each group of instructions at least one of a first counter value indicative of said counter value at a start of execution of said group and a last counter value indicative of said counter value at an end of execution of said group.

The index value can index the trace information in a number of ways, but in some embodiments it comprises a counter. A counter is simple a way to provide an indexing function and furthermore, provides indexing that is easily compressible. It may be in some embodiments that both the first and last count values are stored for a group, while in others only one of them is stored. The value of the counter at the start of execution of the group and at the end of the execution of the group can be used when instructions are cancelled or committed to determine exactly which trace elements that have been output relate to cancelled and committed instructions. If only one of them is stored the trace elements that relate to cancelled and committed instructions can still be determined in cases where the number of trace-active instructions in a group is limited to two and where there is a multiple traced value stored for a group. In such a case the other of the first and last value can be deduced. An advantage of this is that the multiple traced value is a single bit, while a count value will be multiple bits.

In some embodiments, said trace circuitry is configured on receipt of a cancelling indication from said data processing apparatus indicating that a selected group of instructions which has been speculatively executed has been cancelled to generate a cancelling item of trace indicative of said cancelled selected group of instructions and to include information regarding a difference between said current counter value and said last counter value at a start of execution of said cancelled group in said cancelling item of trace.

When a group of instructions are cancelled it is important that the diagnostic apparatus analysing the trace elements can deduce this, otherwise the diagnostic apparatus will not be able to analyse the executed stream correctly. When counter values have been used to index the trace elements, cancelling can be indicated to the diagnostic apparatus by simply providing a cancelling item of trace indicating how many of the trace elements that have been output in the stream are cancelled elements.

In some embodiments, said trace circuitry is configured to determine said information regarding said difference in dependence upon said traced-interesting value.

It may be that in some of the cancelled groups there were no traced instructions and the information output regarding the number of groups of instructions that are cancelled should not imply that a group that was cancelled that did not output a trace element. The traced interesting value is used to amend the output value so that this is not implied.

In some embodiments, said trace unit is responsive to receipt of a committing indication from said data processing apparatus that a selected group of instructions which has been speculatively executed has been committed to generate a committing item of trace indicative of said selected group and to include information regarding a difference between said current counter value and said last counter value for said selected group.

In a similar way to cancelling, the indexing of the groups of instructions can be used to indicate which instructions have been committed. When calculating what value to output to indicate which instructions are committed, the traced interesting value is also helpful so that where there are groups that have no instructions that have been traced the committing signal does not imply that some of the trace elements that are output belong to these groups.

A second aspect of the present invention provides a data processing system comprising a data processing apparatus for executing a stream of instructions and a trace unit according to a first aspect of the present invention for monitoring said data processing apparatus.

A third aspect of the present invention provides a method for generating items of trace data indicative of processing activities of at least one processor executing at least one stream of instructions, said at least one stream of instructions comprising a plurality of groups of instructions, said at least one processor executing at least some of said instructions speculatively, said method comprising the steps of: monitoring a behaviour of said at least one processor using trace circuitry controlled by current trace control data; storing at least some of said trace control data associated with one of said groups of executed instructions; in response to detecting said at least one processor cancelling at least one group of said speculatively executed instructions, retrieving at least some of said trace control data stored in said data store for said group of instructions executed immediately before said cancelled speculatively executed instructions and controlling said trace circuitry with said retrieved trace control data.

A fourth aspect of the present invention provides a trace means for generating items of trace data indicative of processing activities of at least one processor executing at least one stream of instructions, said at least one stream of instructions comprising a plurality of groups of instructions, said at least one processor executing at least some of said instructions speculatively, said trace means comprising: trace monitoring means for monitoring a behaviour of said at least one processor controlled by current trace control data; a data storage means for storing at least some of said trace control data associated with a corresponding one of said groups of executed instructions; said trace monitoring means being for storing said at least some of said trace control data in said data storage means in response to detection of execution of said group of instructions; said trace monitoring means being responsive to detecting said at least one processor cancelling at least one group of said speculatively executed instructions to retrieve at least some of said trace control data stored in said data storage means for said group of instructions executed before said cancelled speculatively executed instructions and to control said trace monitoring means with said retrieved trace control data.

The above, and other objects, features and advantages of this invention will be apparent from the following detailed description of illustrate embodiments which is to be read in connection with the accompanying drawings.

BRIEF DESCRIPTION OF THE DRAWINGS

FIGS. 5 to 10 show example, execution and tracing of instructions in groups;

FIG. 13 shows how the trace control values change during execution of groups of instructions.

DESCRIPTION OF THE PREFERRED EMBODIMENTS

Figure 1:
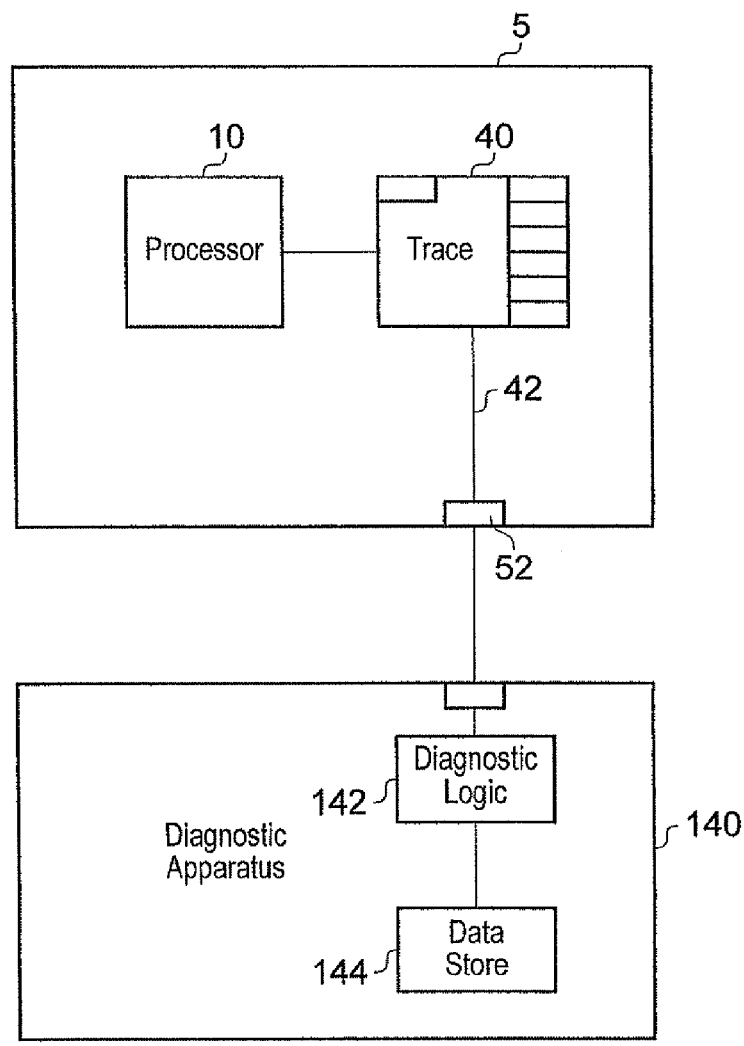
FIG. 1 shows a system having data processing apparatus and a diagnostic apparatus for analysing execution of a program by the data processing apparatus.

FIG. 1 shows a system with a data processing apparatus 5 executing a stream of instructions some of them speculatively, a trace unit 40 for monitoring the execution of the instructions and for generating a trace stream 42, which is output via output 52 to diagnostic apparatus 140. Diagnostic apparatus 140 has diagnostic logic 142, which may take the form of a software program. Diagnostic logic 142 analyses the trace stream in conjunction with the program being executed by processor 10, which is stored in data store 144, and outputs information regarding the execution of the program by the data processing apparatus 5 which can be used to diagnose any faults.

Figure 2:
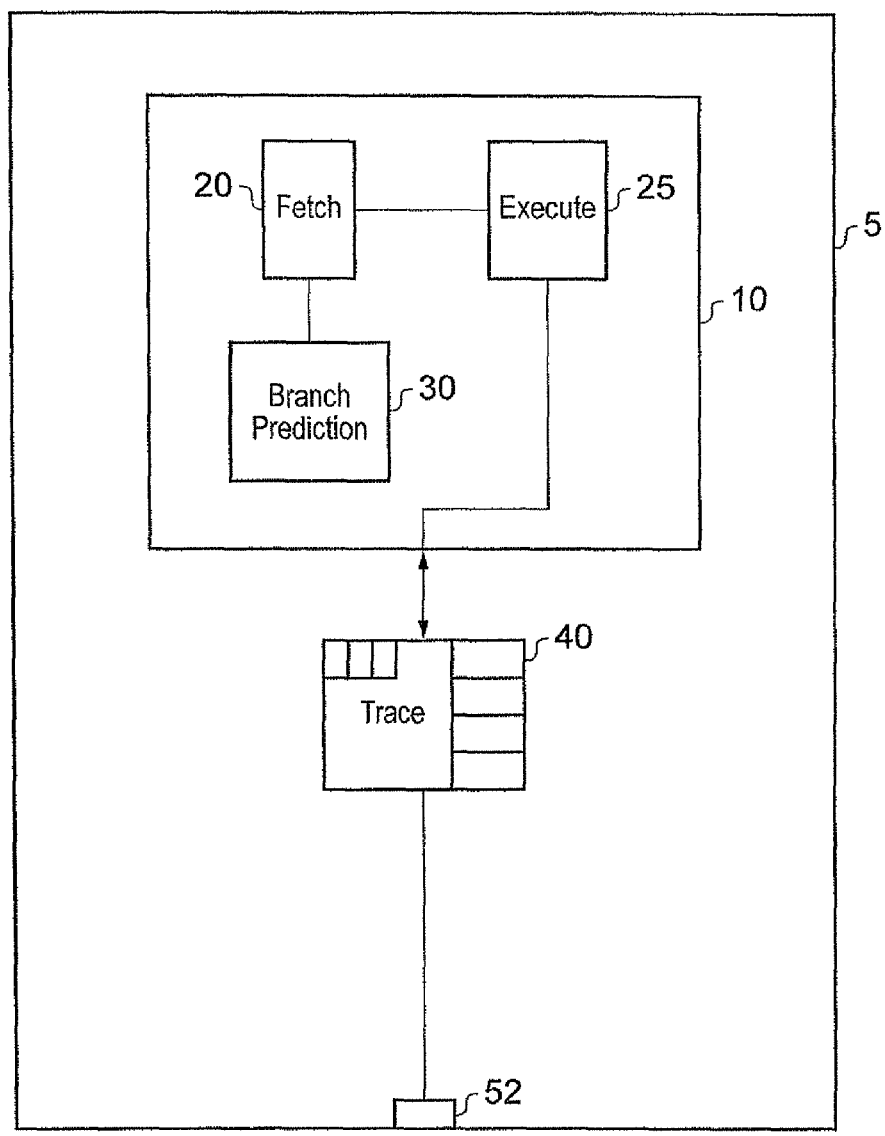
FIG. 2 shows a data processing apparatus having a trace unit according to an embodiment of the present invention.

FIG. 2 illustrates a data processing apparatus 5 including a trace unit 40 according to an embodiment of the present invention. The data processing apparatus 5 comprises processor core 10 (a data processing unit) and trace unit 40 configured to monitor the processing activities of processor core 10 and to generate items of trace data indicative of the processing activities of the core which are output as a trace stream at output 52.

The processor core 10 comprises a fetch unit 20 and an execute unit 25. The fetch unit 20 fetches instructions from memory (not illustrated), and these instructions are passed to execute unit 25 where they are executed. Processor core 10 is a speculative processor, and hence fetch unit 20 is configured to fetch instructions for the execute unit 25 which are predicted by branch prediction unit 30 (though not guaranteed) to be required. Execute unit 25 will speculatively execute these instructions, later cancelling or committing them when it is known whether the speculation was correct or not.

Trace unit 40 is configured to generate trace elements indicative of the processing activities of processor core 10 including the speculative execution of instructions, and to output them as a trace data stream at output 52. Whilst it would in principle be possible for trace unit 40 to buffer items of trace data generated in association with speculatively executed instructions, and only to release them in the output trace stream once the speculation is resolved, this would require considerable storage space within trace unit 40 which would be expensive in area.

Thus in the embodiment illustrated in FIG. 2, trace unit 40 is configured to generate trace data for both speculatively and non-speculatively executed instructions and to generate cancel or commit signals once it is known whether the speculation was correct or not. In this way the trace data can be understood by a diagnostic apparatus that is analysing it.

Figure 3:
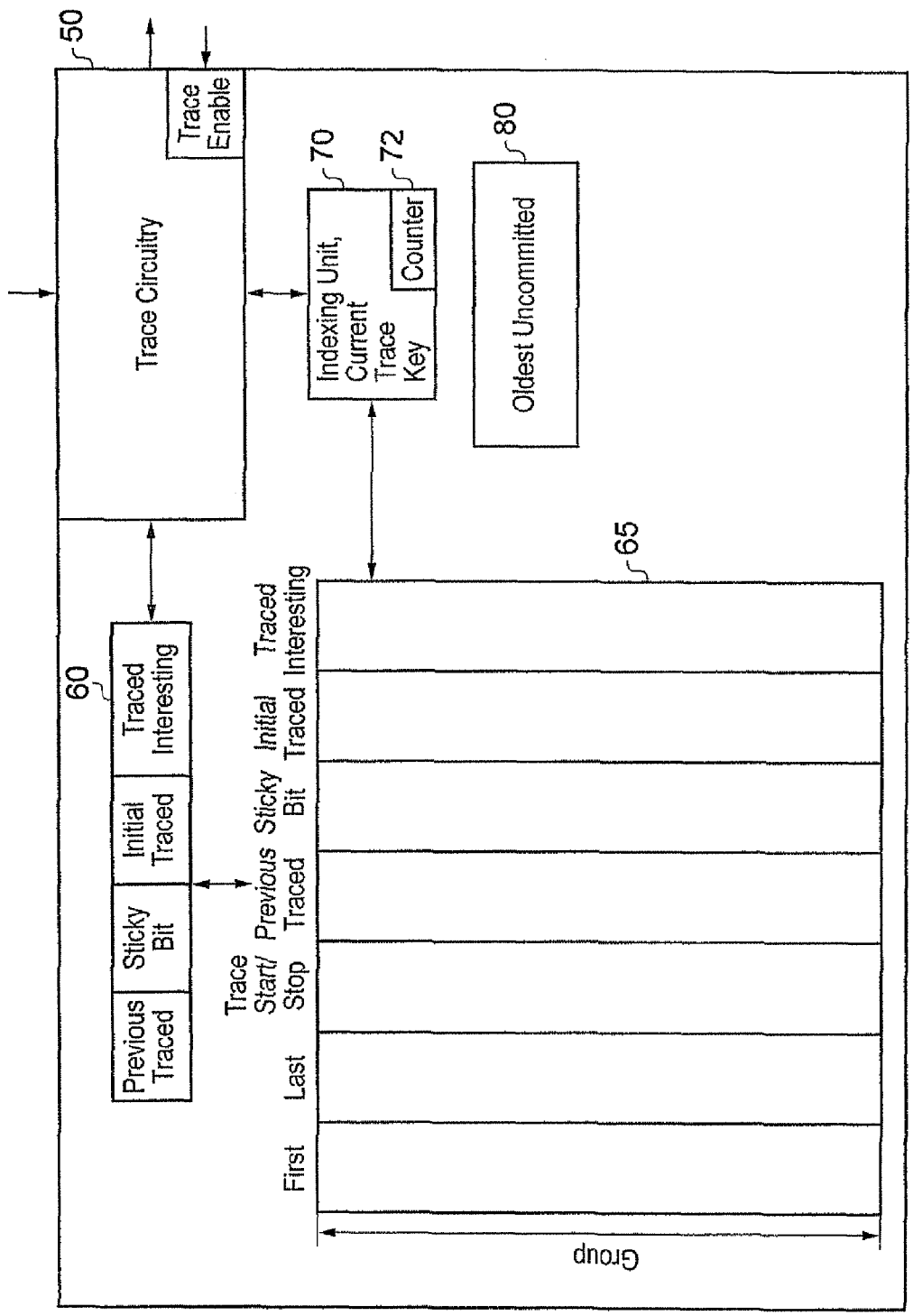
FIG. 3 shows an embodiment of a trace unit according to the present invention.

Trace unit 40 is shown in more detail in FIG. 3. Trace unit 40 has trace circuitry 50 that receives signals from the processor core. It monitors the signals and generates trace elements where appropriate and outputs these trace elements in the form of a trace stream which is sent to a diagnostic apparatus. Trace unit 40 also receives a trace enable signal and this sets a trace enable bit within trace circuitry which controls whether trace elements are output or not.

Trace unit 40 has in this embodiment a register 60 for storing trace control data that along with the trace enable value controls the operation of trace circuitry 50. It should be noted that in some embodiments these values are not stored in a register the data simply being signal values that are detected. Furthermore, in many embodiments these control values have two possible values and are thus generally represented as single bits. The trace unit also has a data store 65 for storing trace information such as the trace control data that relates to instructions that have been speculatively executed and have not yet been committed or cancelled. This information is required both to update the register 60 if instructions are cancelled to values that were current before the execution of the cancelled instructions and also to enable information regarding the cancelling or committing of groups of instructions to be output in the trace stream such that sufficient information is transmitted to the diagnostic apparatus to enable it to determine which items in the trace stream relate to instructions that were cancelled. Thus, the trace circuitry outputs trace signals indicative of which instructions were cancelled or committed as well as trace items indicating processing activities of the processor. In this way the diagnostic apparatus can make sense of the trace stream and be aware of how many traced instructions were cancelled or committed.

The resetting of any trace control values that may have changed during speculative execution to values they had prior to the incorrect speculative execution is important to enable the trace circuitry to operate correctly.

In order to manage the speculative execution efficiently the instructions are managed as groups of instructions. This is possible provided instructions are grouped into indivisible blocks of instructions that are committed and cancelled as a whole and where exceptions cannot occur in the middle of a group.

When tracing instructions, trace circuitry makes use of these groups and uses a trace key to count each time a trace-active instruction is executed and a trace element output. The value of the trace key at the beginning and end of execution of the group the so-called first and last values are stored in data store 65. In this way as instructions are committed and cancelled as groups, the beginning and end of the groups can be determined. These trace key values can also be output occasionally to allow the diagnostic apparatus to determine exactly where in the instruction stream the processing is. Generally it is sufficient to output a trace element indicating a trace active instruction has been executed and count values indicating how many instructions have been cancelled or committed to determine this.

Details of how the trace keys are generated and stored is set out below. Trace unit 40 is provided with trace indexing unit 70. The indexing unit 70 is configured to associate an index value or trace key with at least a subset of the items of trace data generated by the trace unit 50. In particular, the indexing unit 70 is configured to generate the index values as a predetermined sequence of index values, wherein an $n+1^{th}$ index value can be determined from an $n^{th}$ index value in the predetermined sequence. In the embodiment illustrated, this functionality is provided by a counter 72 in the indexing unit 70.

Trace unit 50 comprises a counter 72, which provides the predetermined sequence of index values which the trace unit 40 can associate with (some of) the items of trace data it generates. The trace unit 40 also comprises a data store 65 in which index values generated by counter 72 may be stored. The data store 65 stores a first and last counter value for each group that is speculatively executed, along with further trace control values for that group. For the first instruction in a speculatively executed group of instructions, the trace unit 40 is configured to store the current counter value from counter 72 into the first index storage unit of data store 65 (indexed by the group number). Conversely, when a new group is started, the current counter value is stored in the last index storage unit of data store 65.

In the embodiment illustrated, the data store 65 has sufficient entries to correspond to the maximum speculation depth of the processor, in terms of groups of instructions. The maximum speculation depth of the processor represents the maximum number of entries which the data store 65 may have to hold, since beyond that depth the processor must commit or cancel a group of instructions, which will free up an entry in the index storage unit.

There is also a data store for storing the oldest uncommitted value, which can be used in response to a signal to commit a particular group to output to the diagnostic tool, which instructions are actually committed.

Tracking of instructions during speculative execution is not straightforward, particularly where trace enable may switch value during the execution of a group. In order to be able to successfully track this execution additional information to the first and last count value may be required and thus, data store 65 stores additional values.

Register 60 that stores the current trace control data controlling the trace circuitry stores a previous traced value, a sticky bit, an initial traced value and a traced interesting value. The previous traced value is the trace enable value of the final instruction of the previous group, the sticky bit is set when a previous instruction does not output trace data and is cleared when it does. The value of the sticky bit when the final instruction of a preceding group executed, is stored in data store 65 as the sticky bit for the subsequent group, however, its value in register 60 is updated as instructions are executed, but the updated value is not stored in the data store 65 for that group. The initial traced value is the trace enable of a first instruction in a group, traced interesting indicates that a group contains a traced instruction. These values are required so that the diagnostic apparatus can determine when the trace circuitry indicates that say 2 groups were committed how this relates to the trace elements output, particularly if trace was not enabled for one of the groups so that it wasn't actually traced. How these values are updated and used are explained with respect to the following figures.

Data store 65 also stores a trace start/stop value for the group. This is the value of the start/stop bit before the first instruction in the group. When in the stopped state trace is disabled, i.e. trace enable is 0, while following the start transition trace-enable will depend on other sources, until the stop transition.

The start condition for example, could be the address of the first instruction in a subroutine and the stop condition could be the address of the last instruction in the subroutine. In this way only instructions in the subroutine are traced.

In order that start/stop behaviour is consistent after a cancel it is necessary to store the start/stop value in the data-store and rewind to it on a cancel. This is because we want the start/stop behaviour to be defined by architecturally executed instructions not just speculatively executed instructions.

Thus, when a new group starts, the start/stop value before the first instruction in the group is processed is stored in the line in the data store corresponding to the group.

When a group is cancelled the start/stop bit is retrieved from the line in the data store corresponding to the cancelled instruction.

Figure 4:
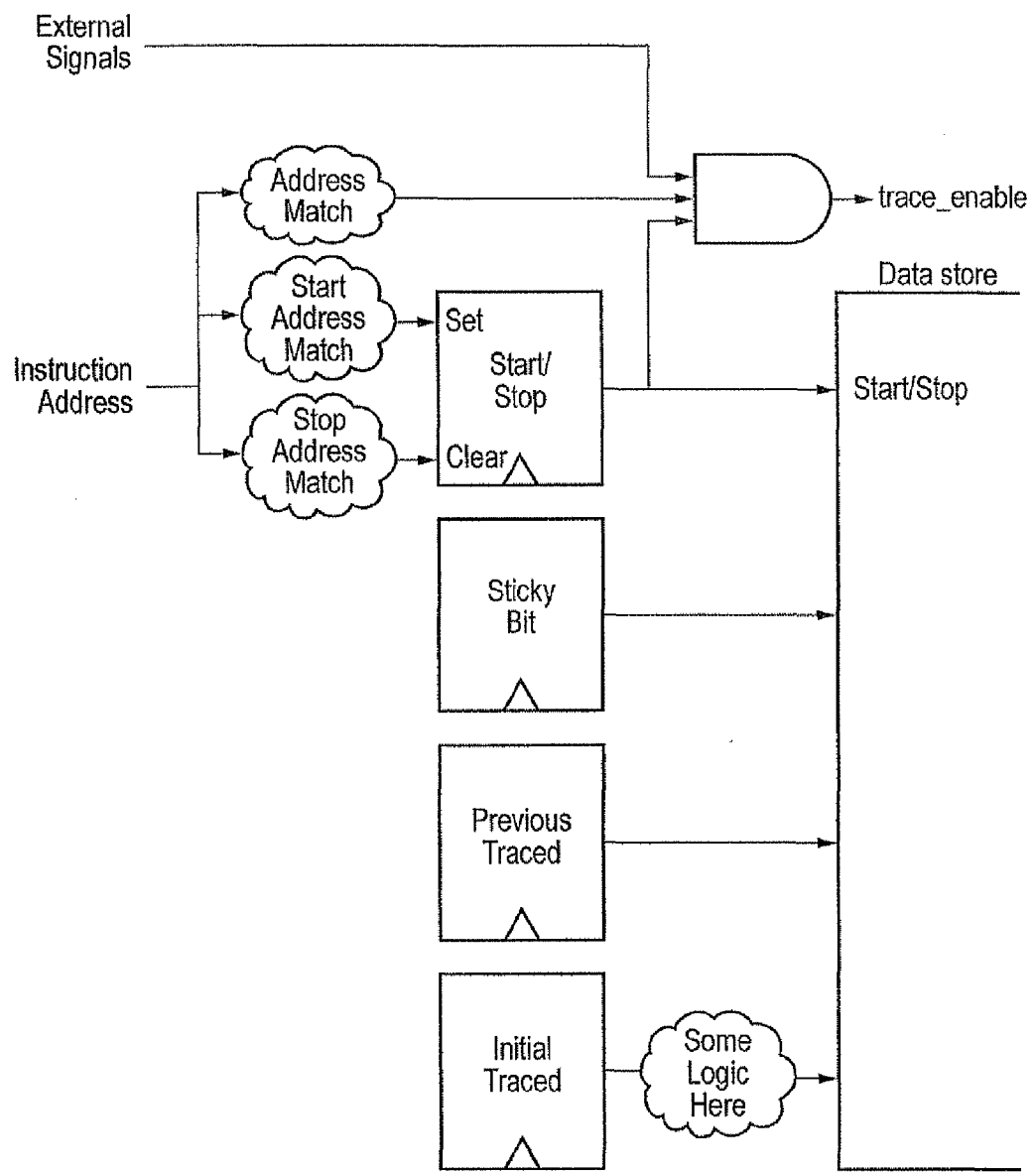
FIG. 4 schematically shows setting of the trace start/stop value.

FIG. 4 shows schematically how the start/stop bit is set and how it is used in the decision as to whether or not trace should be enabled. Thus, an instruction address is received then a match is performed to see if the instruction address is within a range defined when the trace unit is configured. If it is the start/stop bit is set. Similarly a match is performed to see if the instruction address is within the stop address range defined when the trace unit is configured. If it is the start/stop bit is cleared.

FIG. 5 shows an example of groups A, B, C and D of instructions that are executed and traced and are then committed. The trace output is simply an E atom in this case, the keys are not output but are updated for each instruction and some of them are stored in data store 65 of FIG. 3.

Thus, in this example, group A is executed and this contains a branch instruction and thus, as trace is enabled a trace element E is output and a key 1 which is the value of the counter 72 of FIG. 3 is associated with this instruction and is stored for group A. The counter is then incremented. The next instruction to be executed is in group B and as this is a new group the current trace key value, i.e. key 2 is associated with the branch instruction of group B. Group B contains a branch and as trace is still enabled another trace element is output and the counter 72 is incremented to key 3. The next instruction is in a new group and is also a branch and trace is still enabled and thus, a further trace element is output, trace key 3 is associated with this instruction and the counter 72 is incremented.

The next instruction to be executed is in group D, this instruction is a trace-inactive instruction, i.e. one that the trace circuitry is configured not to generate trace element for, thus no trace element is output and the key is not incremented. There is then a branch instruction and this generates a trace element and has the current value of the trace key 4 associated with it, the counter is then incremented. The trace circuitry 50 then receives a commit signal from the processor indicating that group C has been committed and thus, group C and the groups preceding it, i.e. A and B are no longer speculative. This needs to be transmitted to any diagnostic tool that is analysing the trace output and thus, a commit signal is added to the trace output. This commit signal needs to indicate which exact groups have been committed and it does this by outputting the key value for the group that was committed minus the key value of the oldest previous committed case which is stored (in store 80 of FIG. 3). Thus, in this case as no previous group has been committed, the value to be output is key 3, being the key value associated with the final instruction in group C-0 and thus, a key 3 signal is output. The diagnostic apparatus would be able to determine from this that instructions in groups A, B and C have been committed.

The value of the last key stored for that group, i.e. key 3 is then stored in the oldest committed store.

It should be noted that in this embodiment, rather than storing the first and last counter values for each group as is shown in the data store 65 of FIG. 3, a single key value is stored in data store 65 and this is the key value associated with the final instruction in any group.

FIG. 6 shows a similar example to that shown in FIG. 5, except that trace is disabled during execution of some of the instructions. In FIG. 6 trace is disabled for group C's execution and for half of group D. Thus, in this case the execution of group A triggers output of a trace element, the current value of counter 72, trace key 1 is stored as the key value for group A and the counter 72 is then incremented. Group B is then entered and the current counter value 2 is stored for group B and the execution of the branch instruction in group B triggers the output of a trace element and the increment of the key value to key value 3. Trace output is then disabled and the execution of branch C does not trigger a trace element to be output. Thus, the current value of the counter key 3 is stored for group C and as no trace element is output it is not incremented. A new group is then entered, group D, this sees a first instruction that is trace-inactive and trace is disabled in any case so no trace element is output and the counter is not incremented. Trace is then enabled and the next trace-active instruction to be executed is the branch in group D and therefore a trace element is output and the current key value 3 is stored for this group and the counter is then incremented to 4.

The trace circuitry then receives a signal indicating that group C has been committed and a signal indicating this needs to be sent in the trace output stream. However, group C has not been traced.

In order to address this potential problem a traced-interesting value is used in the trace control data. This value is set for a group of instructions where there is a traced-active instruction in that group that is traced, and it is clear, i.e. not set, if there is no instruction in a group that is traced. Thus, it is clear for group C. It is used where a group is committed or cancelled. In this case, group C is committed and it has traced-interesting value clear. The key value stored for group C is a 3 and as the traced-interesting bit is clear, the commit is calculated to be the value of the stored key—the value of the oldest uncommitted (0 in this case)— 1, i.e. 2. Thus, a commit 2 signal is sent and the diagnostic apparatus can thereby deduce that the previous two traced elements belong to groups that have been committed, i.e. groups A and B are committed. If the commit value did not have a one subtracted from it, then a commit 3 signal would be output and the diagnostic tool analysing the trace output would assume that the first three traced instructions had been committed, i.e. including branch D. This would be incorrect. If traced-interesting was set, then a 1 would not have been subtracted from the key value, however, in this case branch C would have been traced.

The oldest uncommitted value is then set to key 3.

The traced-interesting value can also be used when speculation has reached the speculation depth of the processor and the counter has wrapped around. In such a case, the key to commit or cancel may be the same value as the oldest previous commit. This provides a calculated commit value of 0, and one cannot otherwise be sure if 0 are being committed or the maximum speculation depth N. This can be deduced from the traced-interesting bit of the final group, if it is set, then the value cannot be zero and it must be N, if it is clear then it cannot be N, so it must be zero.

In some embodiments data store 65 stores first and last counter values for a group of instructions and these values can be used to determine what values in the trace stream need to be cancelled or committed in response to the speculative instructions being cancelled and committed. This is described below.

In some embodiments, such as the embodiment shown in FIG. 3 first and last counter values are stored in data store 65 for each group. Thus, counter 72 provides the predetermined sequence of index values which the trace unit 40 can associate with (some of) the items of trace data it generates. For the first instruction in a speculatively executed group of instructions, the trace unit 40 is configured to store the current counter value from counter 72 as the first value for that group, conversely, when a new group is started, the current counter value is stored as the last value for that group.

The data store 65 is configured to have sufficient entries to correspond to the maximum speculation depth of the processor, in terms of groups of instructions. The maximum speculation depth of the processor represents the maximum number of entries which the index storage unit may have to hold, since beyond that depth the processor must commit or cancel a group of instructions, which will free up an entry in the index storage unit.

The use of the first and last value is now described with reference to Table 1 below. Table 1 shows how the counter value, the oldest uncommitted value, and the tracking table are updated in the trace unit 110, in the situation where the processor core 100 speculatively executes groups of instructions A, B and C and subsequently indicates that group B should be cancelled and group A should be committed.

Group A starts with a load (LDR) instruction which is "interesting" and currently being traced. Hence, the entry of first index unit 230 corresponding to group A ("A.first") stores the current counter value of 0 and then the counter is incremented to 1. Finally the entry of last index unit 240 corresponding to group A ("A.last") stores the current counter value of 1. The next instruction in group A is the move instruction (MOV) which is neither "interesting" nor traced. The last instruction of group A is the branch-if-equal (BEQ) instruction which is both "interesting" and traced, so the counter is incremented to 2. The entry of last index unit 240 corresponding to group A ("A.last") is then updated with the current counter value of 2. It should be noted in fact that the final step for each instruction is always for the entry of last index unit 240 corresponding to the current group to be updated with the current counter value. Of course only if the counter has been updated for that instruction does this have any effect. The updating of the "last" value in this way is not explicitly described for the remaining instructions shown in Table 1.

Group B begins with the ADD instruction which is neither "interesting" nor traced, but as the first instruction in a new group causes the current counter value 2 to be stored in the corresponding entry of the first index value storage unit (i.e. B.first=2). The second instruction in group B is the SUB instruction which is similarly neither "interesting" nor traced and does not update any values.

Group C begins with the store (STR) instruction which is both "interesting" and traced, hence the current counter value is stored in the C.first entry of the first index storage unit and the counter is then incremented to 3. The second instruction in group C is the branch-if-not-equal (BNE) instruction which is also "interesting" and traced, so the counter is updated to 4.

Next, the processor core 100 indicates that the speculative execution of group B was incorrect and therefore groups B and C should be cancelled. In response, trace unit 110 (controlled by trace control unit 200) references the current count value of counter 210, which is currently 4, and the value stored in the corresponding entry of the first index storage unit 230 (i.e. B.first) which is 2. Trace unit 110 thus determines that two items of trace data should be cancelled (4-2) and generates an item of trace data indicative of this fact. The counter 210 is then reset to 2 (since it was previously 4 and 2 items have been cancelled).

Next, the processor core 100 indicates that instruction group A should be committed, since it has determined that the speculative execution of this group of instructions was correct. In response trace unit 110 (under control of trace control unit 200) references the value stored in the oldest uncommitted storage unit 250 (currently 0) and the entry in the last index storage unit 240 corresponding to this group (i.e. A.last) which is 2. The trace unit 110 thus determines that two items of trace data (2-0) should be committed, and generates an item of trace data indicative of this fact. The value stored in the oldest uncommitted storage unit 250 is then reset to the "last" value read for this group, i.e. 2 in this example.

In the embodiment described with reference to Table 1, it will be noted that the cancelling and committed is performed by reference to a number of events wherein the generated item of trace data indicates the number of events that should be cancelled or committed. In an alternative embodiment the trace unit can generate the cancelling/committing item of trace with reference to an event number. When this is the case, for a cancelling item of trace, the event number will be taken from the "first" value, i.e. the corresponding entry of the first index value storage unit, and for a committing item of trace the event number is taken from the "last" value, i.e. corresponding entry in the last index value storage unit. Note that although it might appear that committing and cancelling by event number would require less hardware (since the subtraction is not required), it should be noted that when indicating the cancelling/committing by a number of events this can often be compressed because it will generally have leading zeros. The choice of whether to commit/cancel by "number of event" or "event number" can be determined depending on the system requirements, i.e. whether less hardware in the trace unit or less bandwidth in the trace stream is deemed more important.

TABLE 1

Index storage unit values during speculative execution

| Group | Execute | Trace | Count value before | Oldest uncommitted count | Tracking table updates | Notes |
|---|---|---|---|---|---|---|
| A | LDR | LDR | 0 | 0 | A.first = 0<br>A.last = 1 | Count → 1 |
| A | MOV | | 1 | 0 | A.last = 1 | |
| A | BEQ | BEQ | 1 | 0 | A.last = 2 | Count → 2 |
| B | ADD | | 2 | 0 | B.first = 2<br>B.last = 2 | |
| B | SUB | | 2 | 0 | B.last = 2 | |
| C | STR | STR | 2 | 0 | C.first = 2<br>C.last = 3 | Count → 3 |
| C | BNE | BNE | 3 | 0 | C.last = 4 | Count → 4 |
| | Cancel Group B | Cancel 2 items | 4 | 0 | | Current count = 4, B.first = 2, therefore cancel 2 items (4-2); Count → 2 |
| | Commit Group A | Commit 2 items | 2 | 0 | | Oldest uncommitted = 0, A.last = 2, therefore commit 2 items (2-0); Oldest uncommitted → 2 |

A further example is now discussed with reference to Table 2 below, in which the trace unit further filters the trace generated, in the example given by not tracing the store (STR) instruction. The values given in Table 2 for groups A and B are the same as those given in Table 1. However, for the first instruction of group C the STR instruction is not traced, so the count is not incremented. Hence, only when the BNE instruction in group C (which is traced) is encountered is the count incremented to 3.

Hence, when the processor core issues the "cancel B" message, the trace unit 110 determines that the current count is 3, B.first is 2 (as in the Table 1 example), and therefore only one item of trace (3-2) should be cancelled. Similarly the count is only reduced by one (to a value of 2). When the processor core issues the "commit A" message, as in Table 1, the oldest uncommitted count is 0, A.last=2 and therefore two items of trace are committed. The oldest uncommitted count is then updated to 2.

TABLE 2

Index storage unit values during speculative execution with filtered trace

| Group | Execute | Trace | Count value before | Oldest uncommitted count | Tracking table updates | Notes |
|---|---|---|---|---|---|---|
| A | LDR | LDR | 0 | 0 | A.first = 0<br>A.last = 1 | Count → 1 |
| A | MOV | | 1 | 0 | A.last = 1 | |
| A | BEQ | BEQ | 1 | 0 | A.last = 2 | Count → 2 |
| B | ADD | | 2 | 0 | B.first = 2<br>B.last = 2 | |
| B | SUB | | 2 | 0 | B.last = 2 | |
| C | STR | | 2 | 0 | C.first = 2<br>C.last = 2 | Not traced, so count not incremented |
| C | BNE | BNE | 2 | 0 | C.last = 3 | Count → 3 |
| | Cancel B | Cancel 1 | 3 | 0 | | Current count is 3, B.first = 2, therefore cancel 1 item (3-2); Count → 2 |
| | Commit A | Commit 2 | 3 | 0 | | Oldest uncommitted count is 0, A.last = 2, therefore commit 2 items (2-0); Oldest uncommitted count is now 2. |

FIG. 7 shows the use of the previous-traced control value in control register 60 to inhibit the output of a trace on signal where it is not needed as the instructions that were executed while trace was off have been cancelled. The previous-traced value is the trace enable value when the final instruction of the previous group was executed. Thus, in the example of FIG. 7, the previous-traced value is clear for group B. When trace is enabled for group B a trace on signal is output along with a trace element E for branch B as would be expected and a state element 2000 (not shown) indicating where in the core execution the program is when trace is turned on. Trace is then turned off again while group C is executed. Group C is then cancelled and then group D is executed. As group C has been cancelled, then the group preceding group D is now group B and as trace was enabled for this group the previous-traced value is set for group D. In response to the previous-traced being set trace circuitry inhibits the output of the trace-on signal even though trace enable has transitioned. If group C had not been cancelled then previous-traced would have been set for group D and a trace on signal would have been generated in response to the transition of the trace enable signal.

FIG. 8 shows another example where trace enable changes value. In this case, group A is a branch and trace is enabled and a trace element is output and initial-traced is set, as it is the value of trace enable for the first instruction in a group. Trace is then not enabled and group B starts execution. Initial-traced is therefore clear for group B as the first instruction in group B has traced not enabled, and previous-traced is set as the final instruction in group A had trace enabled. Trace is enabled for the second instruction of group B and as this is mid group a trace on instruction is always output in response to this and a state 3004 is output indicating where the processor was in the execution when trace is turned on. The next instruction in group B is then executed and a trace element output. A cancel signal is then received from the core indicating that group B is to be cancelled. There has been one trace element output for group B and thus cancel is a 1.

The trace circuitry checks the initial traced-value associated with the cancelled group B and the previous-traced currently stored. If initial-traced is clear and previous-traced is set, then this indicates that trace enable changed values during execution of the cancelled group and thus a state element would have been output. Thus, in response to these values a new state element is output.

Thus, in this case the next instruction to be executed is a trace-inactive instruction in group C, and a state element 4000 is output in response to the initial-traced value that was stored for group B and the previous traced value stored for group C. The diagnostic apparatus will now then know that trace is from address 4000 and not 3004.

In summary a force-state-output is output when previous_traced is 1 and initial_traced is 0, both values retrieved from the same line of the table corresponding to the cancelled group. With respect to FIG. 8 where group B is cancelled. The instruction before group B is traced but the first instruction of group B is not traced, hence previous_traced=1 and initial_traced=0. A second trace-on is not output because the previous_traced value is 1 for the first group after the cancel.

There are four possible values of previous_traced and initial_traced:

| Previous traced | Initial traced | |
|---|---|---|
| 0 | either 0 or 1 | When tracing next goes on we will output trace-on and hence output state anyway |
| 1 | 0 | There might have been a trace-on and new-state output before the cancel. If we trace the next instruction we must output a new state. But trace-on will not be set because previous_traced = 1. So we set force_new_state. |
| 1 | 1 | Trace was always on so no trace-on was output at this point previously. Hence no force_new_state is required. |

FIG. 9 shows another problem that can occur when tracing speculative instructions which is addressed by embodiments of the present invention. As noted previously, the amount of trace data generated can be reduced by only tracing certain instructions which are designated as trace-active instructions and not tracing trace-inactive instructions as execution of these instructions can be implied by tracing the execution of the trace-active instructions. Trace-active instructions may be branches, loads and stores, while trace-inactive instructions are other instructions such as arithmetic instructions. However, if this type of tracing is used along with the ability to enable or disable trace then it may be that the execution of these trace-inactive instructions cannot be implied as the subsequent trace-active instruction will not be traced if trace has been turned off. In order to address this problem the sticky value of the trace control data is used. The sticky value is set for a succeeding group when the final instruction in a group that is executed is not a trace-active instruction triggering output of a trace element. This sticky value is stored in the data store for that succeeding group and is also set in the control register 60 of FIG. 3 that controls the trace. The sticky value is then maintained in the trace control register 60 until a trace element is output whereupon it is reset. Thus, if trace is enabled and a trace-active instruction is encountered a trace element is output and the sticky value reset in the control register. This enables a diagnostic apparatus to determine that the trace-inactive instruction at the end of the previous group that did not cause a corresponding trace element to be output did in fact execute.

Thus, in FIG. 9 the sticky value is set for group C in response to the trace-inactive instruction of group B executing. When the branch in group C is executed, despite trace enable being off, a trace element is output as the sticky value is set. This is required so that the diagnostic tool can imply that the NOP of group B was executed. Following output of the trace element, the sticky value in the control register 60 is reset, although the sticky value stored in the data store for group C is still set.

FIG. 10 shows a similar example except that some speculatively executed instructions have been cancelled. In this case group A has trace enabled and outputs a trace element. Group B has trace enabled but is a trace inactive instruction so it does not output a trace element. The sticky value is however set. Group C is then executed and although trace is not enabled, the branch triggers the output of a trace atom as the sticky value is set. The sticky value is then reset in the control register 60 of FIG. 3, but it remains set for group C in data store 65. Group D is then executed, and trace is enabled again so a trace atom is output. There is no "trace-on" output as the sticky value was set for the previous group.

A cancel group C is then received from the core and a cancel 2 is output to indicate that the two previous atoms should be cancelled. When cancelling group C, some of the trace control values stored for group B are loaded into the control register. The stored sticky value for group B is set, so this is loaded into the control register, an exception then occurs, and as the sticky value is set in the control register this is traced even though trace enable is low.

Figure 11:
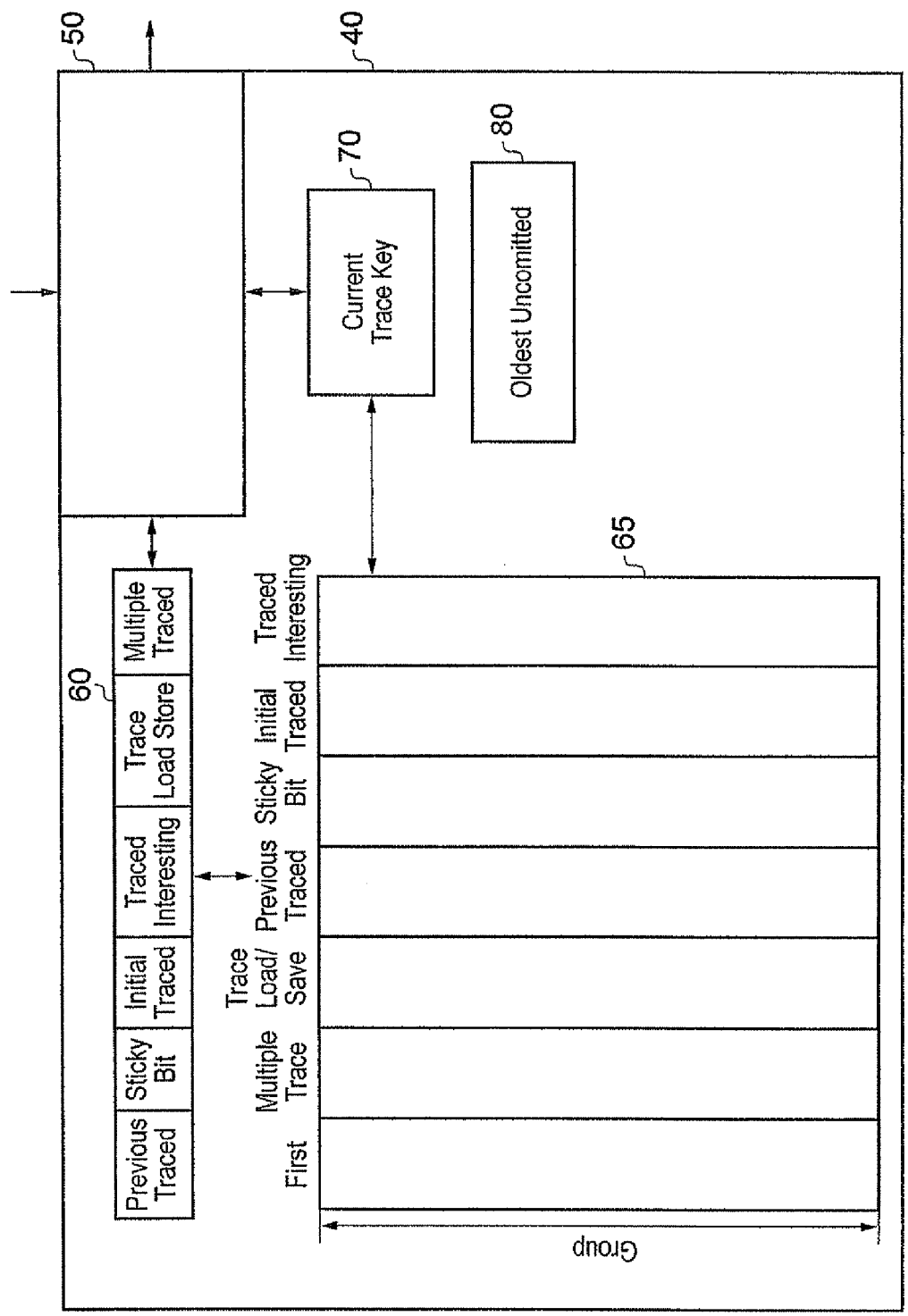
FIG. 11 shows the trace unit according to another embodiment of the present invention.

FIG. 11 shows a trace unit 40 similar to the one of FIG. 3 except that there is an additional trace control value, multiple-traced in register 60 and in data store 65. In this embodiment, the apparatus is configured so that all groups contain no more than two trace-active instructions and multiple traced is set if it is determined that a group contains two trace-active instructions and it is clear if a group contains one or no trace-active instructions (this being determined from traced_interesting). In this way, only the first or in some embodiments just the last key value needs to be stored in data store 65 and the other one can be determined from whether the multiple traced value is set or not.

Thus, rather than storing a count value which may be multiple bits, a single bit can be stored to indicate the other key value to that one stored.

In other embodiments the multiple-traced value may be several bits wide and store the total number of trace-active instructions in a group. If this is the case, the counter can be updated using this value. Although this value is now multiple bits wide, it is still more efficient than storing two trace keys indicating the first and last count values would be. In still other embodiments it may be multiple bits wide and store the total number of trace-active instructions in a group −1. Whether there is one of zero trace_active instructions being determined from the traced_interesting value.

It should be noted that the trace control values are set for a group and are stored in the data store 65 when a new group is encountered. This is except for the traced-interesting which is updated as appropriate for each instruction in a group and the final value is stored for the group. The initial sticky value in control register 60 is stored in data store 65 for that group, but it may be updated as the group is executed, the updated value is not stored in the data store.

Figure 12A:
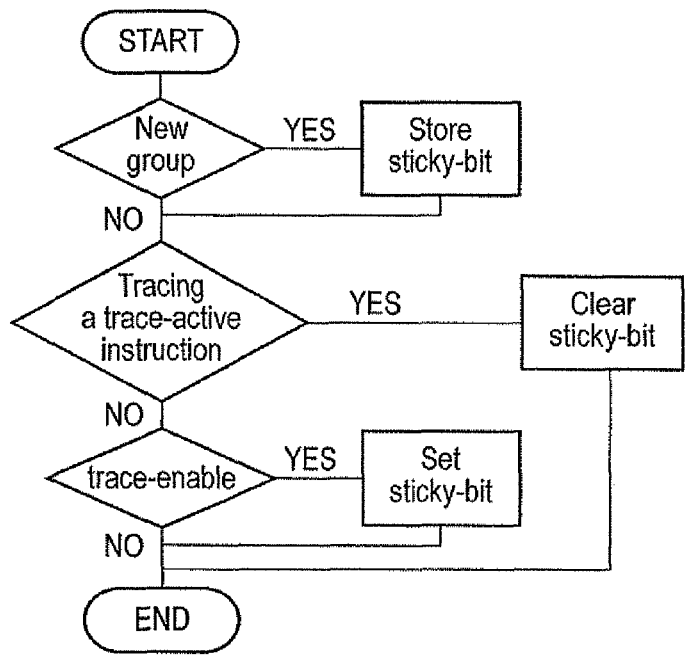
FIGS. 12a-c show flow diagrams indicating how trace control values are set in response to execution of instructions.
Figure 12B:
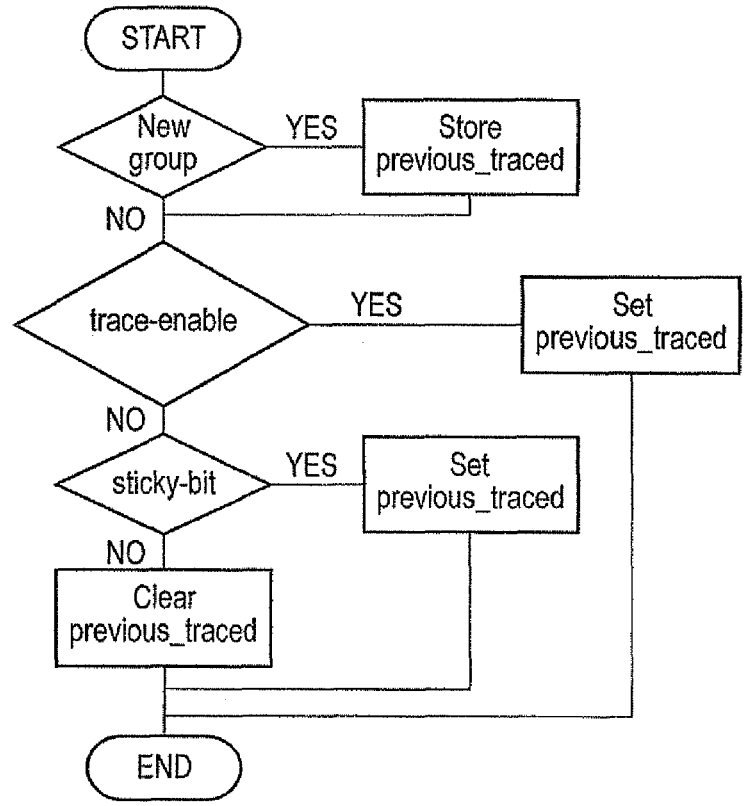
Figure 12C:
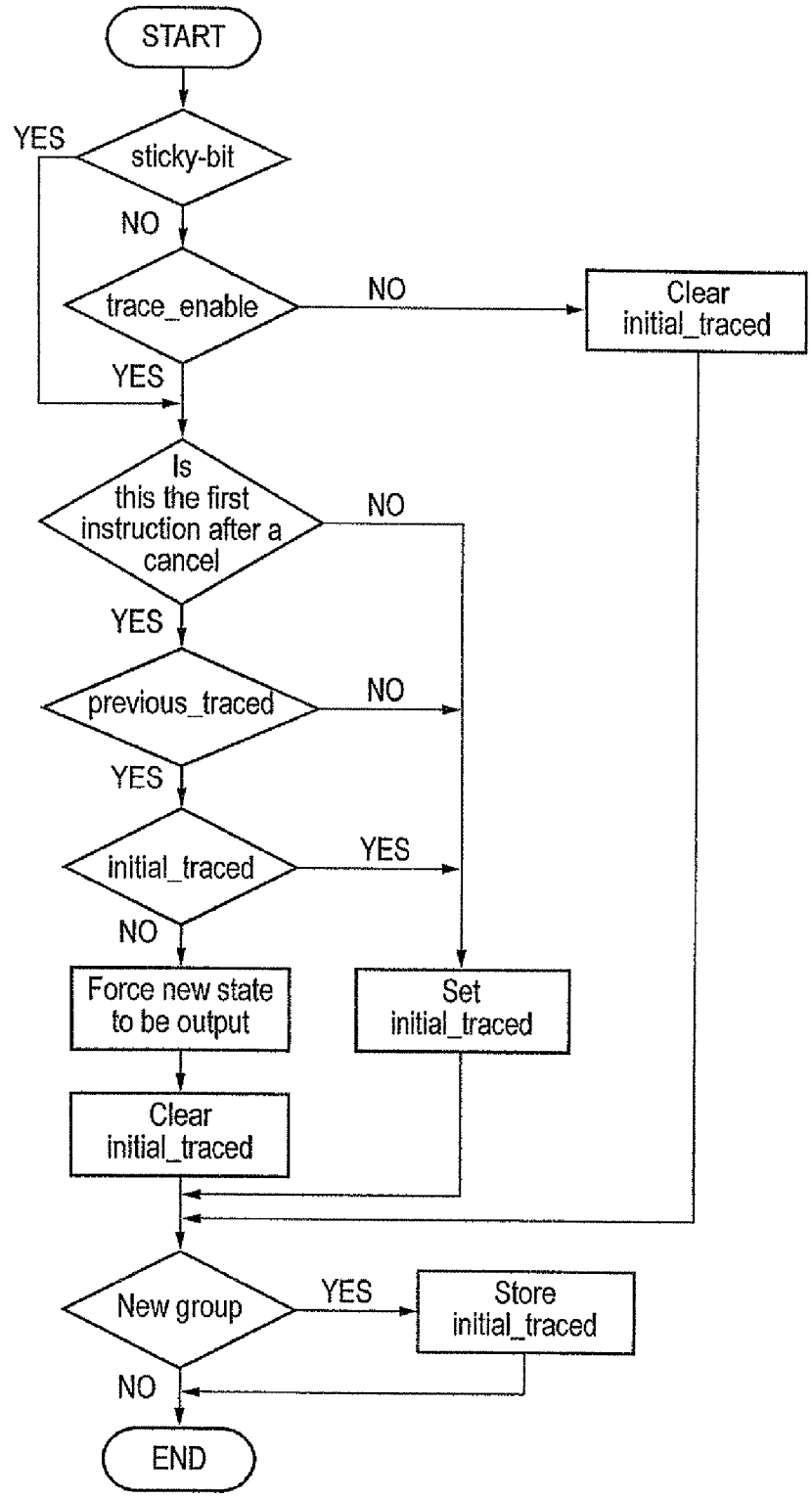

FIGS. 12a to 12c are flow diagrams illustrating how the various trace control values are updated.

FIG. 12a shows how the sticky bit is set and cleared. Initially it is determined if a new group has been received, if so then the current sticky bit is stored in the data store 65. It is then determined whether or not a new group has been received if the instruction is a trace active instruction, if it is then the sticky bit is cleared, if it is not then it is determined if trace is enabled if it is then the sticky bit is set. Then if there is a trace-active instruction the sticky bit is cleared, while if the instruction is not a trace active instruction and trace is enabled then it is set.

FIG. 12b shows how previous-traced is set. When a new group starts the current value of previous-traced is stored in data store 65. It is then determined if trace is enabled if it is then previous-traced is set if not it is determined if the sticky bit is set if it is then previous-traced is set if not it is cleared.

FIG. 12c shows how initial_traced is updated and how it is used to determine when output of a new state should be forced when a group has been cancelled. Thus, at the start of execution of a group it is determined if the sticky bit is set. If the sticky bit is set then whether or not trace is enabled the values of previous_traced and initial_traced for any cancelled group need to be considered.

If the sticky bit is not set it is determined if trace is enabled. If it is not, initial-traced is cleared (this being the value of trace_enable for the first instruction of a group), if it is set it is then determined if this is the first instruction after a cancel. If it is then the values of previous_traced and initial_traced for the cancelled group are considered.

Previous traced for the cancelled group being set indicates that trace was enabled when the final instruction of the group before the cancelled group executed, while initial_traced being clear indicates that it was not enabled when the first instruction of the cancelled group was executed. Thus, it may have been enabled during execution of the cancelled group and a state element may have been output. Thus, in response to detecting this a force new state occurs. This ensures that when a group has been cancelled and it is determined that trace_enable may have transitioned from 0 to 1 causing a state to be output, a new state is output so that the trace diagnosis tool will be able to determine where in the program execution the program is.

Initial_traced is then cleared, as in this case trace is not enabled for the first instruction of that group (as it is reset to the value it had for the cancelled group which from initial_ traced being clear indicates trace was not enabled). If initial_traced is set for the cancelled group, then initial_traced is set as trace is enabled for the first instruction in this group.

If the instruction is not the first instruction after a cancel or if previous_traced is not set then initial_traced is set as trace is enabled for the first instruction of the group and initial_traced reflects this.

Then when a new group is started the value of initial_traced for the group just executed is stored.

FIG. 13 shows example of instruction execution and how the counter key values and the trace control values change. Thus, the initial instruction to be executed is in group A and has an address 1000 and is a branch instruction. Trace is enabled so a trace element is output and the current counter value which is key 1 is stored as the trace key for this instruction. The sticky value is 0 at this point and initial trace is set to 1. There are no load stores, no multiple trace instructions and no previous traced values yet and the oldest committed instruction is 0.

The next instruction to be executed is in group B and is a trace inactive instruction. Trace is still enabled and the counter has incremented to 2 so a key 2 is stored with respect to this group and the sticky value is set as a trace inactive instruction has executed. The previous traced value is set to 1 as trace was enabled when the last instruction of the previous group executed and initial trace is set to 1 as trace is enabled when the first instruction of this group executed.

The next instruction to be executed is in group C. It is again a trace inactive instruction and trace is now not enabled. The counter value does not increment and thus, key 2 is associated with this instruction in group C and the sticky value remains set.

The next instruction to be executed is a branch and trace enable is still off. However, as the sticky value is set a trace atom is output anyway to indicate to any diagnostic apparatus analysing the trace stream that the previous instruction at 3000 had executed. The counter value of key 2 is stored with respect to this instruction and the counter is then incremented. In response to the output of this trace atom the sticky value is reset.

The next group to be executed is group D and trace is enabled and it is a branch instruction so a trace element is output. The counter value is key 3 and thus, key 3 is stored associated with this instruction. The sticky value is still 0, previous traced is 0 as trace was not enabled when the final instruction of group C executed and initial trace is 1 as trace was enabled when the first instruction in group D executed.

Trace circuitry then receives a signal indicating that the instructions are cancelled back to group C. The key stored for group C is key 2 and the oldest committed is 0, thus a cancel signal of 2-0 i.e. 2 is sent to the diagnostic apparatus in the trace stream and the counter is decremented by 2. The control state controlling the trace is restored from the data store values relating to group C.

The next instruction to be received is in group E and is a branch and trace is enabled so a trace element is output and the key is incremented and key 2 is stored with respect to this instruction. The previous traced and initial trace are both set to 1 and multiple trace is set to 1 as there is a further trace active instruction in this group which is the load instruction. Trace load store is also set to 1 to indicate that addresses associated with the load and store instruction need to be output. In this case, trace is not enabled so no addresses are output.

The next instruction is in group F and is a trace inactive instruction. At this point trace enable turns on and thus, a trace on and state output are output. The counter does not increment and the sticky value is not set as this is a trace inactive instruction.

The next instruction in group F is a branch so a trace element is output. The sticky value is reset and the counter is incremented to 4.

The next thing to be received from the core is an indication that group B should be committed. The stored key value for group B is key 2 and thus, normally a commit 2 signal would be output as the oldest committed value is 0. However, traced interesting is 0 for group B indicating that group B was not traced and thus, a commit 1 is output which indicates that the branch instruction in group A has been executed.

Figure 14:
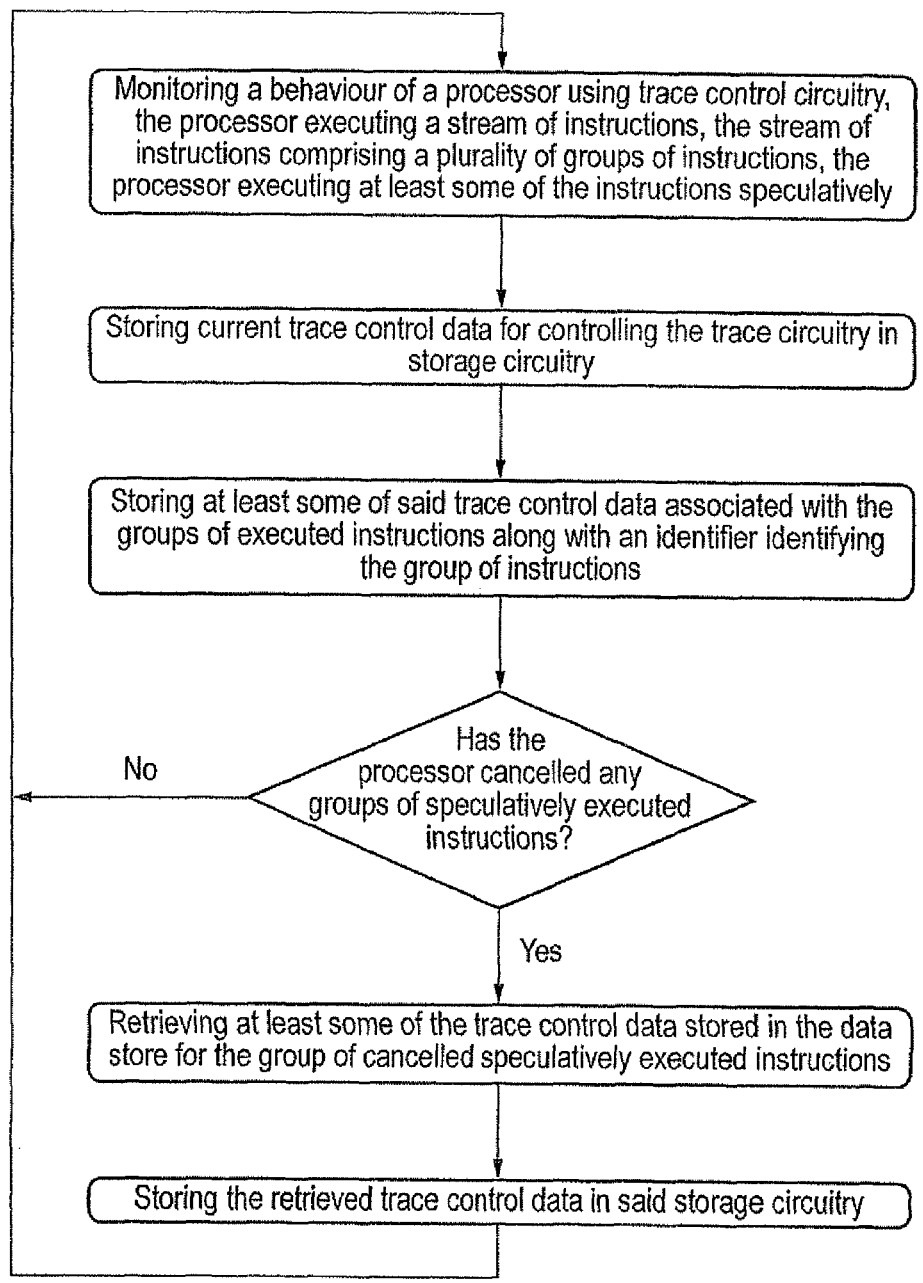
FIG. 14 shows a method of tracing data according to an embodiment of the present invention.

The next group is then group G. The counter continues to increment and an atom is output as it is a trace active instruction and trace is enabled. It should be noted that the counter is not affected by the commit signal, FIG. 14 shows a flow diagram illustrating a method according to an embodiment of the present invention.

The behaviour of a processor processing a stream of instructions arranged in groups of instructions is monitored by trace control circuitry. Current trace control data for controlling the trace circuitry is stored in storage circuitry and when a group has executed, at least some of this trace control data for the executed groups is stored in a data store along with an identifier identifying the group. It is then determined if the processor has cancelled any groups of speculatively executed instructions. This is determined by the trace control circuitry that is monitoring the processor. If instructions have been cancelled, then the trace control data for the group of instructions immediately preceding the cancelled instructions is retrieved and stored in the storage circuitry so that the trace circuitry is controlled by the correct trace control data. If not the trace circuitry continues to monitor the processor under control of the trace control data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A trace unit for generating items of trace data indicative of processing activities of at least one processor executing at least one stream of instructions, said at least one stream of instructions comprising a plurality of groups of instructions, said at least one processor executing at least some of said instructions speculatively, said trace unit comprising:

trace circuitry configured to monitor a behaviour of said at least one processor, wherein said trace circuitry is configured to be controlled by trace control data;

a data store configured to store a plurality of pieces of said trace control data, each associated with a corresponding one of said groups of instructions that has been executed;

wherein said trace circuitry is configured to update said data store to store each of said plurality of pieces of said trace control data in said data store, in response to detecting execution of said corresponding one of said group of instructions;

wherein said trace circuitry is responsive to detecting a cancelled group of instructions from said plurality of groups of instructions, wherein said cancelled group of instructions has been speculatively executed and cancelled by said at least one processor, to retrieve at least one of said plurality of pieces of said trace control data stored in said data store and to control said trace circuitry with said retrieved trace control data.

2. A trace unit according to claim 1, said trace unit further comprising storage circuitry for storing said trace control data for controlling said trace circuitry; wherein in response to detecting said cancelled group of instructions, said trace circuitry stores said retrieved trace control data in said storage circuitry.

3. A trace unit according to claim 1, wherein said trace control data is stored in said data store along with an identifier identifying said corresponding one of said groups of instructions.

4. A trace unit according to claim 1, wherein said trace circuitry is configured to retrieve said one of said plurality of pieces of said trace control data stored in said data store associated with said cancelled group of instructions.

5. A trace unit according to claim 1, wherein said groups of instructions comprise instructions grouped such that if a first instruction within said group is executed all of said instructions within said group will execute.

6. A trace unit according to claim 1, said trace unit being responsive to a trace enable signal being asserted to enable said trace circuitry to monitor said behaviour of said at least one processor and being responsive to said trace enable signal not being asserted to inhibit said trace circuitry from monitoring said behaviour.

7. A trace unit according to claim 6, wherein said trace control data comprises a sticky value, said trace circuitry being responsive to said sticky value having a predetermined value to output a trace value for a subsequently executed trace-active instruction whether or not a trace enable signal has an enabled value, a trace-active instruction being an instruction triggering output of an item of trace data and to reset said sticky value.

8. A trace unit according to claim 7, wherein said trace circuitry is responsive to detecting execution of an instruction where said instruction is not a trace-active instruction triggering output of an item of trace data, to set said sticky value in said trace control data.

9. A trace unit according to claim 8, wherein said trace circuitry is responsive to detecting execution of a final instruction in one of said groups of instructions, where said final instruction is not a trace-active instruction triggering output of an item of trace data, to set said sticky value in said trace control data and to store said set sticky value in said data store for a subsequent group of instructions.

10. A trace unit according to claim 1, wherein said trace control data comprises a previous-traced value, and said trace circuitry is responsive to detecting trace not being enabled when a final instruction in a preceding group of instructions is executed to set said previous-traced value for a subsequent group of instructions to indicate said detecting trace not being enabled, and said trace circuitry is responsive to detecting said cancelled group of instructions and to said previous-traced value stored associated with said cancelled group of instructions is set to indicate said detecting trace not being enabled to output, when a next instruction in said at least one stream of instructions is to be traced, a trace element indicating said trace is turning on.

11. A trace unit according to claim 1, said trace control data comprises an initial-traced value, said trace circuitry being responsive to output of a trace state element indicating an execution address during execution of a group of instructions to set said initial-traced value for said group, wherein in response to detecting said cancelled group of instructions for which said initial-traced value is set to indicate the first instruction in said group was not traced, said trace circuitry outputs a further state element indicating an execution address of said instruction executed following said cancel.

12. A trace unit according to claim 1, said trace control data comprising a traced-interesting value, said traced-interesting value being set for a group in response to a trace element being output for said group and being clear for a group where no trace element is output for said group.

13. A trace unit according to claim 1, wherein said trace control data comprises a trace multiple value, said value being set indicating that said group comprises multiple trace-active instructions generating trace elements, said value not being set indicating that said group comprises one or zero trace-active instructions.

14. A trace unit according to claim 1, wherein said trace control data comprises a trace multiple value, said value indicating a number of trace-active instructions generating trace elements in said group.

15. A trace unit according to claim 1, said trace unit being configured to generate an index value and to store said index value associated with each of said groups of instructions, said index value being updated for every trace element generated.

16. A trace unit according to claim 15, said trace unit comprising a counter for generating said index value, said trace circuitry storing in said data store for each group of instructions at least one of a first counter value indicative of said counter value at a start of execution of said group and a last counter value indicative of said counter value at an end of execution of said group.

17. A trace unit as claimed in claim 16, wherein said trace unit is responsive to receipt of a committing indication from said data processing apparatus that a selected group of instructions which has been speculatively executed has been committed to generate a committing item of trace indicative of said selected group of instructions and to include information regarding a difference between said current counter value and said last counter value for said selected group of instructions.

18. A trace unit according to claim 15, said trace unit comprising a counter for generating said index value, said trace circuitry storing in said data store for each group of instructions a first counter value indicative of said counter value at a start of execution of said group and a last counter value indicative of said counter value at an end of execution of said group.

19. A trace unit according to claim 18, wherein said trace circuitry is configured on receipt of a cancelling indication from said data processing apparatus indicating that a selected group of instructions which has been speculatively executed has been cancelled to generate a cancelling item of trace indicative of said cancelled selected group of instructions and to include information regarding a difference between said current counter value and said counter value at a start of execution of said cancelled group of instructions in said cancelling item of trace.

20. A trace unit according to claim 19 said trace control data comprising a traced-interesting value, said traced-interesting value being set for a group of instructions in response to a trace element being output for said group of instructions and being clear for a group of instructions where no trace element is output for said group of instructions, wherein said trace circuitry is configured to determine said information regarding said difference in dependence upon said traced-interesting value.

21. A trace unit according to claim 1, said trace control data comprising a trace start/stop value for said group of instructions, said trace start/stop value influencing whether or not trace enable is set or not, said trace start/stop value being set in response to detected predetermined behaviour of said at least one processor.

22. A data processing unit comprising a data processing apparatus for executing a stream of instructions and a trace unit according to claim 1 for monitoring said data processing apparatus.

23. A trace unit according to claim 1, wherein said trace control data comprises a previous-traced value, and said trace circuitry is responsive to detecting trace being enabled when a final instruction in a preceding group of instructions is executed to set said previous-traced value for a subsequent group of instructions to indicate said detecting trace being enabled, and said trace circuitry is responsive to detecting said cancelled group of instructions and to said previous-traced value stored associated with said cancelled group of instructions is set to indicate said detecting trace being enabled, when a next instruction in said at least one stream of instructions is to be traced, to suppress generation of a trace element indicating said trace is turning on.

24. A trace unit according to claim 1, said trace control data comprises an initial-traced value, said trace circuitry being responsive to output of a trace state element indicating an execution address during execution of a group of instructions to set said initial-traced value for said group, wherein in response to detecting said cancelled group of instructions for which said initial-traced value is set to indicate the first instruction in said group was traced, said trace circuitry is configured to suppress output of a further state element indicating an execution address of said instruction executed following said cancel.

25. A trace unit according to claim 1, wherein
said trace control data comprises a previous-traced value;
said trace circuitry is configured to set said previous-traced value to indicate whether tracing is being performed when a final instruction in a preceding group of instructions is executed; and
said trace circuitry is responsive to detecting said cancelled group of instructions to determine whether a trace on signal should be output, based on said previous-traced value, said trace on signal indicating that tracing is starting.

26. A trace unit according to claim 25, wherein
said trace circuitry is responsive to detecting said cancelled group of instructions to either:
suppress the output of a trace element indicating said trace is turning off,
suppress the output of a trace element indicating said trace is turning on,
output a trace element indicating said trace is turning off, or
output a trace element indicating said trace is turning on,
based on said previous-traced value stored associated with said cancelled group of instructions.

27. A trace unit according to claim 26 said trace control data comprising a traced-interesting value, said traced-interesting value being set for a group of instructions in response to a trace element being output for said group of instructions and being clear for a group of instructions where no trace element is output for said group of instructions, wherein said trace circuitry is configured to determine said information regarding said difference in dependence upon said traced-interesting value.

28. A trace unit according to claim 1, wherein said retrieved trace control data is associated with a group of instructions executed before said cancelled group of instructions.

29. A trace unit according to claim 28, wherein said retrieved trace control data is associated with a group of instructions executed immediately before said cancelled group of instructions.

30. A method for generating items of trace data indicative of processing activities of at least one processor executing at least one stream of instructions, said at least one stream of instructions comprising a plurality of groups of instructions, said at least one processor executing at least some of said instructions speculatively, said method comprising the steps of:
monitoring a behaviour of said at least one processor using trace circuitry controlled by trace control data;
updating a data store to store a plurality of pieces of said trace control data, each associated with one of said groups of instructions that has been executed;
in response to detecting a cancelled group of instructions from said plurality of groups of instructions, wherein said cancelled group of instructions has been speculatively executed and cancelled by said at least one processor, retrieving at least one of said plurality of pieces of said trace control data stored in said data store and controlling said trace circuitry with said retrieved trace control data.

31. A trace means for generating items of trace data indicative of processing activities of at least one processor executing at least one stream of instructions, said at least one stream of instructions comprising a plurality of groups of instructions, said at least one processor executing at least some of said instructions speculatively, said trace means comprising:
trace monitoring means for monitoring a behaviour of said at least one processor controlled by trace control data;
a data storage means for storing a plurality of pieces of said trace control data associated with a corresponding one of said groups of instructions that has been executed;
said trace monitoring means being for updating said data storage means to store each of said plurality of pieces of said trace control data in said data storage means in response to detecting execution of said corresponding one of said group of instructions;
said trace monitoring means for, in response to detecting a cancelled group of instructions from said plurality of groups of instructions, wherein said cancelled group of instructions has been speculatively executed and cancelled by said at least one processor, retrieving at least one of said plurality of pieces of said trace control data stored in said data storage means and controlling said trace monitoring means with said retrieved trace control data.

\* \* \* \* \*